United States Patent
Tamura

(10) Patent No.: US 7,350,779 B2
(45) Date of Patent: Apr. 1, 2008

(54) STRUT MOUNT

(75) Inventor: Nobuyuki Tamura, Osaka (JP)

(73) Assignee: Toyo Tire & Rubber Co., Ltd., Osaka-shi (JP)

(*) Notice: Subject to any disclaimer, the term of this patent is extended or adjusted under 35 U.S.C. 154(b) by 254 days.

(21) Appl. No.: 11/222,972

(22) Filed: Sep. 12, 2005

(65) Prior Publication Data

US 2006/0151928 A1 Jul. 13, 2006

(30) Foreign Application Priority Data

Jan. 12, 2005 (JP) ............................ 2005-005126
Mar. 18, 2005 (JP) ............................ 2005-080115

(51) Int. Cl.
*F16F 7/00* (2006.01)
*F16F 9/54* (2006.01)

(52) U.S. Cl. ................................. 267/220; 188/321.11

(58) Field of Classification Search ................. 267/219, 267/220; 188/321.11; 280/124.154, 124.155, 280/124.164, 124.165, 124.169, 124.177
See application file for complete search history.

(56) References Cited

U.S. PATENT DOCUMENTS

| 4,434,977 | A | * | 3/1984 | Chiba et al. | ........... | 188/321.11 |
| 5,454,585 | A | * | 10/1995 | Dronen et al. | .............. | 267/220 |
| 6,640,942 | B2 | * | 11/2003 | Wakita | .................. | 188/321.11 |
| 6,712,370 | B2 | * | 3/2004 | Kawada et al. | ....... | 280/124.155 |
| 6,969,053 | B2 | * | 11/2005 | Kawada et al. | ....... | 280/124.155 |

| 2005/0155829 | A1 | * | 7/2005 | Germano et al. | ...... | 188/321.11 |

FOREIGN PATENT DOCUMENTS

| DE | 197 55 313 A1 | 6/1999 |
| DE | 203 18 328 U1 | 2/2004 |
| EP | 1 029 719 A1 | 8/2000 |
| EP | 1 316 446 A1 | 11/2001 |
| EP | 1 219 474 A1 | 7/2002 |
| EP | 1 321 319 A | 6/2003 |
| GB | 2 289 109 A | 11/1995 |
| JP | 58-174006 A | 10/1983 |

(Continued)

OTHER PUBLICATIONS

European Search Report dated Jun. 1, 2006, issued in corresponding European Patent Application No. EP 05 01 8016.

(Continued)

*Primary Examiner*—Thomas Williams
(74) *Attorney, Agent, or Firm*—Westerman, Hattori, Daniels & Adrian, LLP.

(57) ABSTRACT

A strut mount capable of reducing the weight and of intensifying the strength and having a good durability is provided. It comprises an inner cylinder, a vibration isolating base body and a pair of upper and lower brackets. The lower bracket is fabricated from aluminum alloy and includes a peripheral wall portion, a bottom wall portion and a first attachment flange while the upper bracket includes a second attachment flange and a lid wall portion. The first attachment flange has plural first through-holes for inserting plural attachment members, the second attachment flange has plural second through-holes for inserting the plural attachment members, and flange portions around the first through-holes of the first attachment flange bulge at their undersides to form respective thick-walled portions.

4 Claims, 5 Drawing Sheets

FOREIGN PATENT DOCUMENTS

| | | |
|---|---|---|
| JP | 2-19945 U | 2/1990 |
| JP | 07-269649 A | 10/1995 |
| JP | 2001-171323 | 6/2001 |
| JP | 2001-171323 A | 6/2001 |
| JP | 2002-274137 A | 9/2002 |
| WO | WO 2006/006203 A1 | 1/2006 |

OTHER PUBLICATIONS

Communication letter from European Patent Office dated Aug. 25, 2006 issued in corresponding European Patent Application No. 05 018 016.5.

* cited by examiner

STRUT MOUNT

BACKGROUND OF THE INVENTION

1. Field of the Invention

This invention relates to a strut mount comprising an inner cylinder to be fixed to a top end of a piston rod of a shock absorber, a vibration isolating base body made of rubber-like elastomer provided on the inner cylinder, and a pair of upper and lower brackets to be fixed to a vehicle body side by means of a plurality of attachment members and forming a housing part in which the vibration isolating base body is accommodated.

2. Description of the Related Art

A strut suspension is generally equipped with a shock absorber for the purpose of damping vertical vibrations. The extremity of the shock absorber is located on a vehicle body side, to which the top end of a piston rod is supported through a vibration isolating base body of a strut mount.

JP Patent Application Publication 2001-171323 A discloses a strut mount comprising a core material (inner cylinder) to be fixed to the top end of the shock absorber, a rubber elastomer (vibration isolating base body) bonded by vulcanization to the core material, and a pair of upper and lower brackets forming a box part (housing room) in which the rubber elastomer is accommodated.

According to this strut mount, the pair of upper and lower brackets are formed respectively in a flat plate shape and a cup shape, and both components are superposed one upon the other and assembled, thereby forming internally the cylindrical housing room. The vibration isolating base body is accommodated in the housing room under compression between the pair of brackets. A cup member assuming S-like form in cross-section is attached to a bottom surface side of the bracket (the surface on an axle side), and in the cup member there is housed and held a base extremity of a bound bumper that is fabricated in a columnar shape from urethane or the like. In the conventional strut mounts like the aforesaid strut mount, the brackets were constructed of an iron press formed product.

In recent years, a demand to low fuel consumption has been stronger and accordingly, a demand to weight reduction of automotive components has been stronger. According to the conventional configuration, however, inasmuch as the brackets were constructed of an iron press formed product, the demand to weight reduction could not be met. It is conceivable to construct the brackets of aluminum alloy, instead, but if the structure of the iron-made brackets is adopted for brackets made of aluminum alloy, the brackets will be wanting in strength.

Therefore an object of the invention is to provide a strut mount that is capable of intensifying the strength thereof while reducing the weight and is superior in durability.

SUMMARY OF THE INVENTION

The present invention is generically directed to a strut mount comprising an inner cylinder to be fixed to a piston rod of a shock absorber, a vibration isolating base body made of rubber-like elastomer provided on the inner cylinder, and a pair of an upper and a lower brackets to be attached to a car body side by means of a plurality of attachment members and forming a housing part, in which the vibration isolating base body is accommodated. And the strut mount is characterized in that the lower bracket is fabricated from aluminum alloy, and includes a peripheral wall portion forming a peripheral wall of the housing part, a bottom wall portion forming a bottom wall of the housing part, and a first attachment flange overhanging radially outwardly from an upper end of the peripheral wall portion, and the upper bracket includes a second attachment flange superposed on an upside of the first attachment flange and a lid wall portion covering the vibration isolating base body; and in that the first attachment flange has a plurality of first through-holes for inserting the plurality of the attachment members, the second attachment flange has a plurality of second through-holes for inserting the plurality of the attachment members, and the first attachment flange has such flange portions around the first through-holes that bulge outwardly of undersides of the flange portions to be configured each as a thick-walled portion.

By the configuration as described above, the plurality of attachment members are respectively inserted through the plurality of first through-holes on the first attachment flange and inserted through the plurality of second through-holes on the second attachment flange, and the first attachment flange and the second attachment flange are superposed one upon the other to be fixed to the car body side. Because the lower bracket is fabricated of aluminum alloy, a weight reduction is feasible. If the first attachment flange is weak in strength, the first attachment flange will repeat downward swaying and parting around the attachment members (e.g., attachment bolts) relative to the second attachment flange and returning to the original superposing position, which leads to the trouble that a strange noise is liable to be generated due to impingement of the first attachment flange to the second attachment flange. In contrast, according to the configuration of this invention, because the undersides of the flange portions around the first through-holes of the first attachment flange are bulged outwardly of the undersides and the flange portions are configured as a thick-walled portion, it is possible to intensify the strength to avoid the aforesaid trouble. Moreover it is possible to achieve a weight reduction of the first attachment flange as compared with a structure that the entirety of the first attachment flange is rendered thick-walled.

In the invention, when the upper bracket is fabricated from aluminum alloy, and when a curved portion is interposed between the first attachment flange and the peripheral wall portion, the curved portion assuming an arc-like shape in axial cross-section inclusive of the axis center of the peripheral wall portion in a manner that the curved portion joins with the first attachment flange and the peripheral wall portion, an upwardly splaying, taper slanting wall portion is interposed between the lid wall portion and the second attachment flange in a manner that the taper slanting wall portion joins with the lid wall portion and the second attachment flange, and the vibration isolating base body is bonded by vulcanization to the inner cylinder, it is possible to achieve a further weight reduction and to construct the upper and lower brackets as a strong structural body.

In the invention, when the attachment members are each an attachment bolt, the first through-holes are each a first bolt through-hole, and the second through-holes are each a second bolt through-hole; the curved portion and the taper slanting wall portion are configured so that a gap between an underside of the taper slanting wall portion and a curved inner peripheral surface portion of the curved portion opposed to the underside is defined to be gradually larger toward a radially inward side and an obliquely downward side of the peripheral wall portion in the state that the first attachment flange and the second attachment flange are fixed to the car body side by means of the plurality of attachment bolts, it is possible to stabilize the fixing state of the first attachment flange and the second attachment flange to the car body, without the taper slanting wall portion riding over the curved portion even if the second attachment flange is bolted to the car body side under its misalignment condition to the first attachment flange.

When each of the thick-walled portions extends, in a radial direction of the first attachment flange, up to a downward side of the curved inner peripheral surface portion thereby joining at its underside with an outer peripheral surface of the peripheral wall portion, it is possible to intensify further the strength of the flange portion.

In the present invention, when the taper slanting wall portion is configured in a manner such that a center of a taper angle of its upside and a center of a taper angle of its downside are located in the same position and the taper angle of the upside is set to be smaller than the taper angle of the downside and that a thickness of the taper slanting wall portion is gradually increased from the lid wall portion toward the second attachment flange, the following operations can be achieved:

Due to the feature that in the taper slanting wall portion, the taper angle of the upside is set smaller than the taper angle of the downside and the thickness is increased gradually from the lid wall portion toward the second attachment flange, it is possible to achieve a weight reduction and to assure the strength of the lid wall portion (and the taper slanting wall portion) against a load input through the vibration isolating base body. Further because the area of the upside of the second attachment flange is enlarged, it is possible to make its contact area with the car body large, thereby to stabilize the installation condition of the strut mount.

According to this invention, it is thus possible to afford such a strut mount that is capable of intensifying the strength while achieving a weight reduction and is superior in durability.

BRIEF DESCRIPTION OF THE DRAWINGS

Now the best mode for carrying the invention into effect will be described by way of example with reference to the accompanying drawings, in which.

DESCRIPTION OF THE PREFERRED EMBODIMENTS

Figure 1:
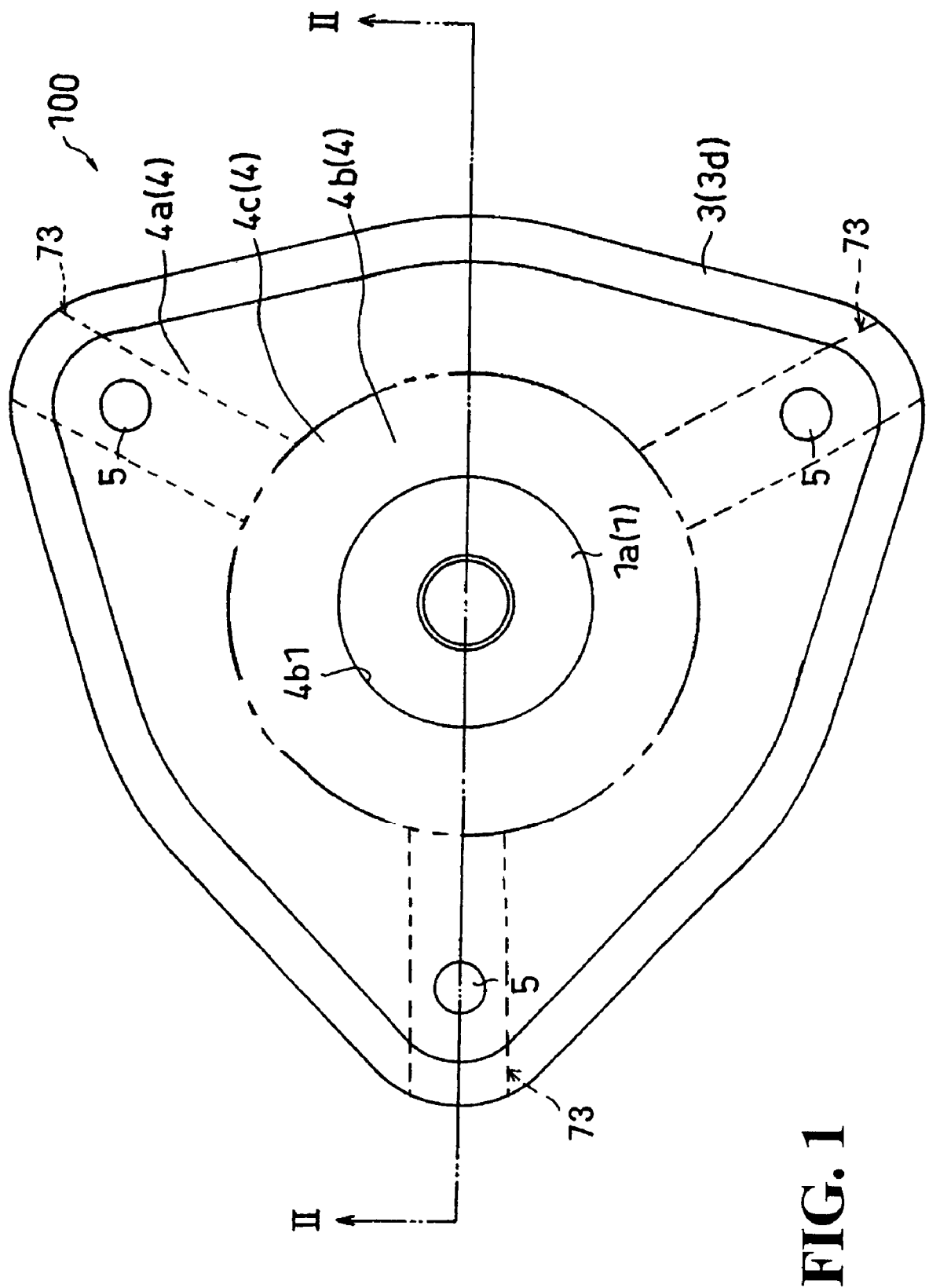
FIG. 1 is a front elevation of a strut mount of the invention.
Figure 2:
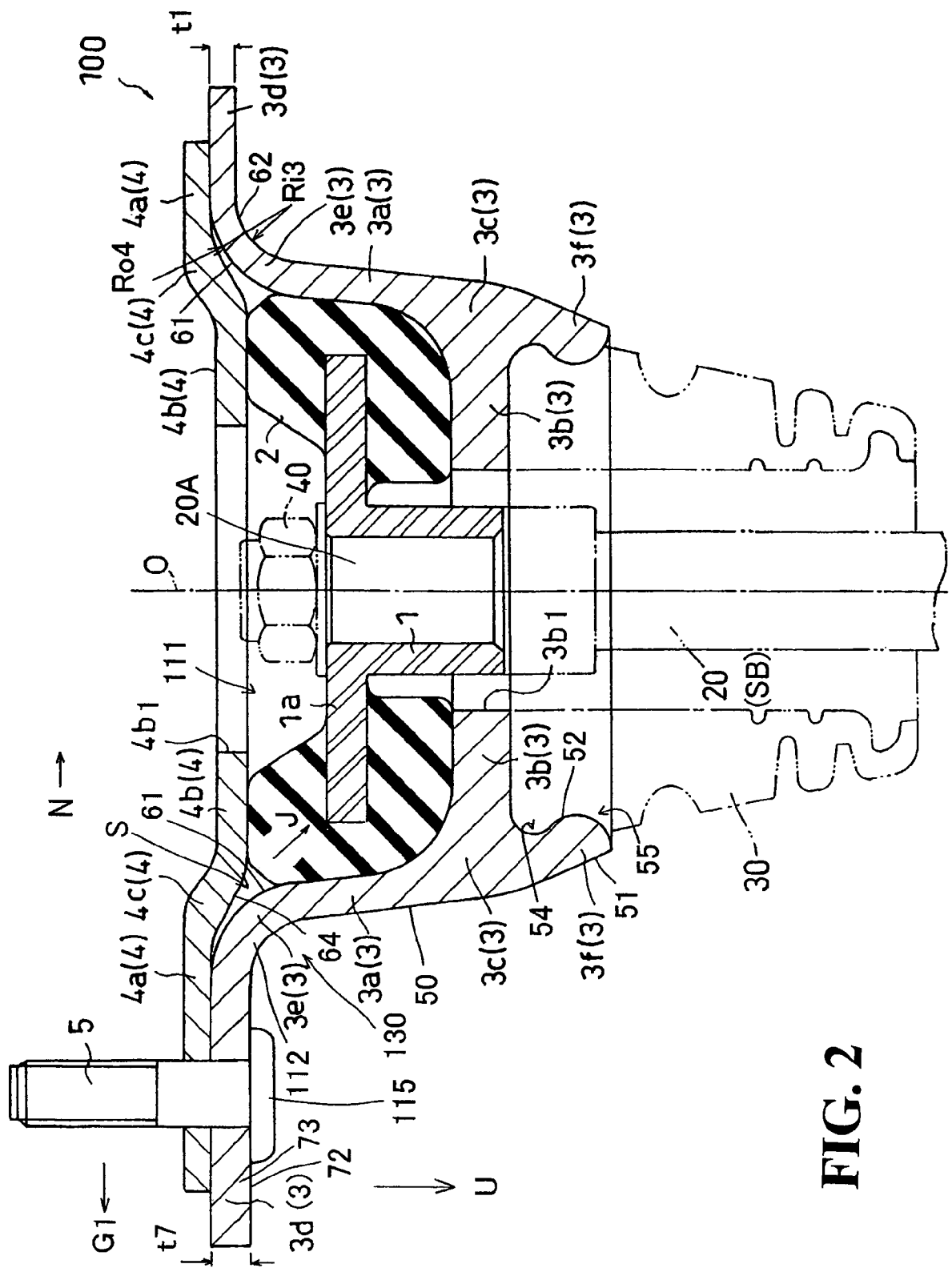
FIG. 2 is a sectional view of the strut mount taken along II-II line in FIG. 1.

FIG. 1 shows a strut mount 100 of a front suspension for a FR (front engine/rear drive) type automobile, and FIG. 2 shows a piston rod 20 of a shock absorber, a bound bumper 30, and a nut 40 threaded on a top end 20A of the piston rod 20 illustrated in two-dot-dash lines.

The strut mount 100 as shown in FIGS. 1 and 2 is made up of an inner cylinder 1 to be fixed to the top end 20A of the piston rod 20 of the shock absorber SB, a ring-like vibration isolating base body 2 made of rubber-like elastomer bonded by vulcanization to a flange portion 1a of the inner cylinder 1, and a pair of an upper and a lower brackets 4, 3 forming a housing part 1 in which the vibration isolating base body 2 is accommodated and to be fixed to a side of a vehicle body F (cf. FIG. 5) by means of a plurality of attachment bolts 5 having respective heads 115 (corresponding to attachment members).

The inner cylinder 1 is an iron-made cylinder, on an inner periphery side of which the piston rod 20 of the shock absorber SB is inserted, as shown in FIG. 2. The piston rod 20 is locked and fixed to the inner cylinder 1 by means of the nut 40 threaded on the top end 20A.

The vibration isolating base 2 is accommodated in a housing part 111 formed by the pair of the upper and lower brackets 4, 3 under a compressive condition, and thus imparted with a predetermined prestress.

Of the paired brackets 4, 3, the lower bracket 3 is a cold forging product of aluminum alloy. The lower bracket 3 is configured in a deep dish-like shape assuming a triangular form when viewed from a top plane (cf. FIG. 1) and is a one-piece member made up of a peripheral wall portion 3a forming the peripheral wall of the housing part 111, a bottom wall portion 3b forming the bottom wall of the housing part, a first attachment flange 3d overhanging radially outwardly (toward G1) from an upper end portion 112 of the peripheral wall portion 3a, a first curved portion 3e interposed between the first attachment flange 3d and the peripheral wall portion 3a and curved in an arc form in cross-section in the axial direction inclusive of a center axis O of the peripheral wall portion 3a, a second curved portion 3c interposed between the bottom wall portion 3b and the peripheral wall portion 3a and curved in an arc form in cross-section in the axial direction inclusive of the center axis O of the peripheral wall portion 3a, and a bound bumper holding portion 3f located beneath the second curved portion 3c. Being interposed between the first attachment flange 3d and the peripheral wall portion 3a in this manner, the first curved portion 3e joins smoothly with the first attachment flange 3d and the peripheral wall portion 3a.

Figure 3:
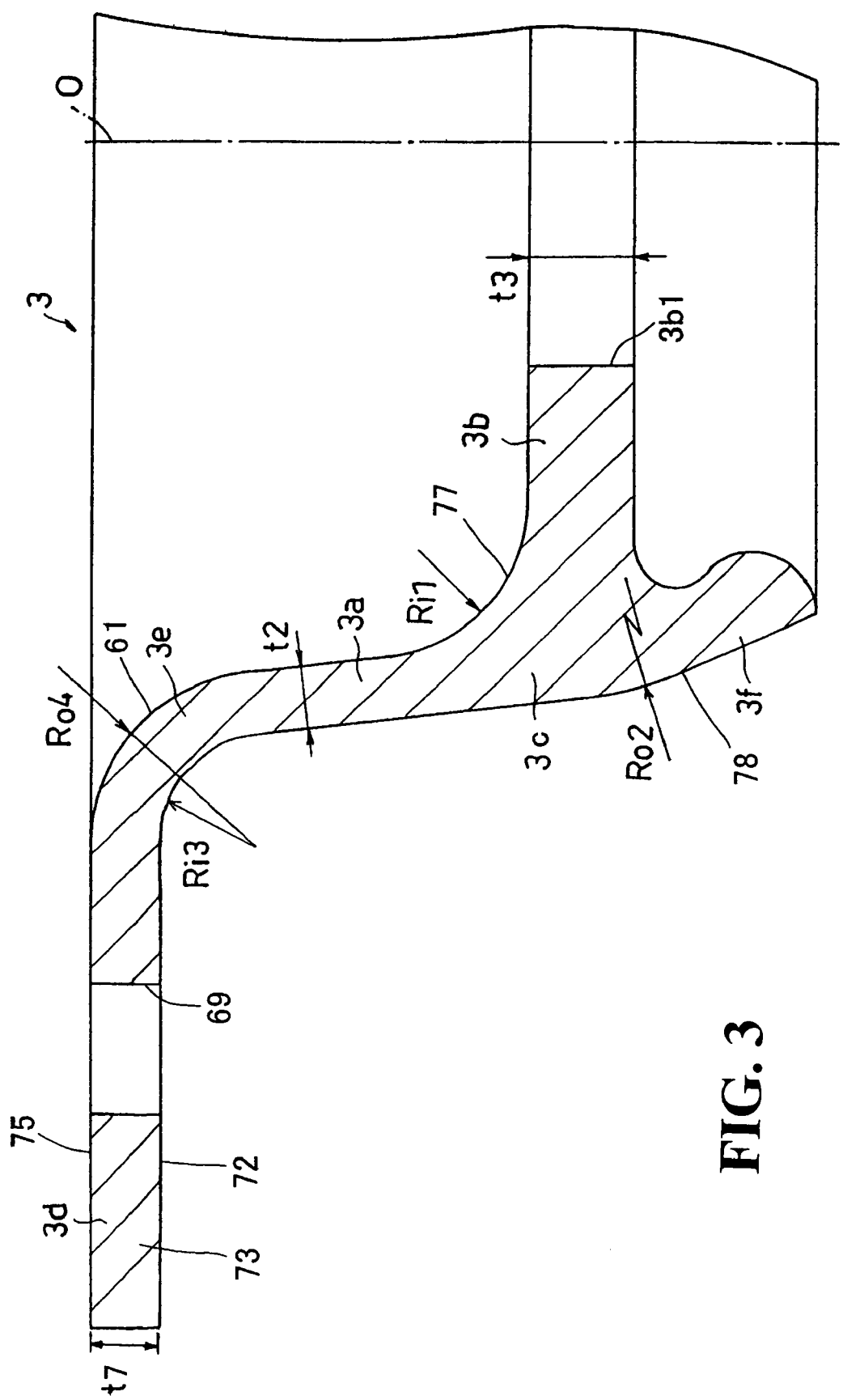
FIG. 3 is a partial enlarged cross-sectional view of a lower bracket.

As shown in FIG. 3, the bottom wall portion 3b is formed, at its central part, with an opening 3b1 through which to insert the inner cylinder 1. A plate thickness t1 of the first attachment flange 3d (cf. FIG. 2, plate thickness of the other portion than a thick-walled portion 73 which will be hereinafter described) is formed to be thinner than a plate thickness t2 of the peripheral wall portion 3a, while a wall thickness t3 of the bottom wall portion 3b is formed to be thicker than the plate thickness t2 of the peripheral wall portion 3a. For example, t1=3 mm, t2=4 mm, t3=6.5 mm are set. In the axial cross-section, a radius of curvature Ri1 of the second curved portion 3c on its inner peripheral curved surface 77 is set in a range of 2 to 3 times the plate thickness t2 of the peripheral wall portion 3a. Ro2 is a radius of curvature of the second curved portion 3c on its outer peripheral curved surface 78. For example, Ri1=10 mm and Ro2=20 mm.

As shown in FIG. 2, Ri3 is a radius of curvature of the first curved portion 3e (radius of curvature of other portion than the thick-walled portion 37 as described below) on its outer peripheral curved surface 62 (concave surface) while Ro4 is a radius of curvature of it on an inner peripheral curved surface 61 (convex surface), and for instance, Ri3=7 mm and Ro4=11 mm are set. In the axial cross-section, an inner peripheral surface 72 of the bound bumper holding portion 3f is contoured in the form of an S-like concave-and-convex surface. Thus the bound bumper holding portion 3f has an upper holding concave portion 54 recessed in an arc form in cross-section and a solid lower holding convex portion 55 bulging in an arc form in cross-section. The reference numeral 51 designates an outer peripheral surface of the bound bumper holding portion 3f.

Figure 4:
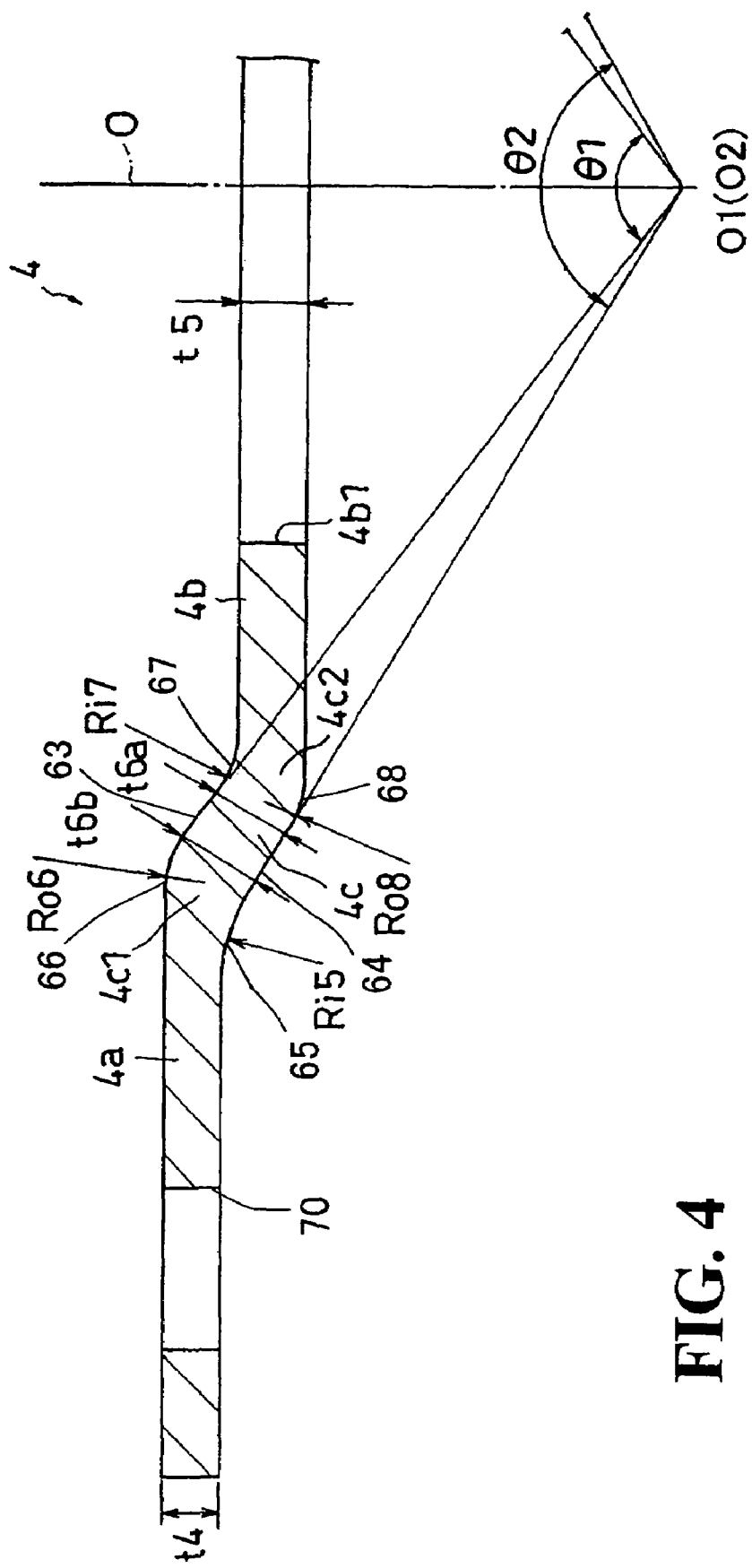
FIG. 4 is a partial enlarged cross-sectional view of an upper bracket.

Of the pair of the upper and lower brackets, the upper bracket 4 is a cold forging product of aluminum alloy. As shown in FIG. 4, the upper bracket 3 is made up of a second attachment flange 4a superposed on an upside 75 of the first attachment flange 3d, a lid wall portion 4b covering the vibration isolating base body 2 and compressing the vibration isolating base body 2 between the lower bracket 3 and itself, and an upwardly splaying taper slanting wall portion 4c interposed between the lid wall portion 4b and the second attachment flange 4a, and has, at its central part, an opening 4b1 pierced through. The upper bracket 4 is formed in a smaller triangular shape than the lower bracket 3 when viewed from a top plane and superposed on the lower bracket 3, with its peripheral positions (apexes of the triangle) registered with those of the latter (cf. FIG. 1). Thus the taper slanting wall portion 4c interposed between the lid wall portion 4b and the second attachment flange 4a joins smoothly with the lid wall portion 4b and the second attachment flange 4a so that the lid wall portion 4b and the lower bracket 3 may compress the vibration isolating base body 2.

As illustrated in FIG. 4, the taper slanting wall portion 4c is configured so that a taper angle center O1 of an upside 63 thereof and a taper angle center O2 of an underside 64 thereof (outer peripheral surface of the taper slanting wall portion 4c) in axial cross-section are located in the same or substantially same position, and given that the taper angle of the upside 63 and the taper angle of the underside 64 are respectively $\theta1$ and $\theta2$, the relationship of: $\theta1<\theta2$ holds true. For example, $\theta1$=106 degrees and $\theta2$=116 degrees. A plate thickness t5 of the lid wall portion 4b and a plate thickness t6 of the taper slanting wall portion 4c are formed to be thicker than a plate thickness t4 of the second attachment flange 4a. By setting the plate thicknesses t4 to t6 of the respective members 4a to 4c in this way, it is possible to achieve both a weight reduction and assuring of strength. Because the taper angle $\theta1$ of the upside 63 of the taper slanting wall portion 4c is set smaller than the taper angle $\theta2$ of the underside 64, the thickness t6 of the taper slanting wall portion 4c is gradually increased from the lid wall portion 4b toward the second attachment flange 4a (t6a<t6b). Thereby it is possible to achieve a weight reduction and ensure the strength of the lid wall portion 4b (and the taper slanting wall portion 4c) to a load input through the vibration isolating base body 2. Further because the area of the upside of the second attachment flange 4a is widened, it is possible to render a contact area of it with the car body large, thereby to stabilize the installation state of the strut mount 100. For example, t4=3 mm, t5=3.5 mm are set. The magnitude of t6 is determined by the taper angles $\theta1$, $\theta2$.

Between the second attachment flange 4a and the taper slanting wall portion 4c, a third curved portion 4c1 curved in an arc form in axial cross-section is provided and between the slanting wall portion 4c and the lid wall portion 4b, a fourth curved portion 4c2 curved in an arc form in cross-section is provided. Given that radii of curvature of an outer peripheral curved surface 65 (concave surface) and an inner peripheral surface 66 (convex surface) of the third curved portion 4c1 are Ri5 and Ro6, and radii of curvature of an outer peripheral curved surface 67 (concave surface) and an inner peripheral surface 68 (convex surface) of the fourth curved portion 4c2 are Ri7 and Ro8, respectively, of these radii of curvature Ri5 to Ro8, the radius of curvature Ri5 of the outer peripheral curved surface 65 of the third curved portion 4c1 is set at a largest value. For example, Ri5=10 mm, Ro6=Ri7=Ro8=5 mm.

On the first attachment flange 3d, three pieces of the first bolt through-holes 69 for inserting three pieces of the respective attachment bolts 5 are formed, while on the second attachment flange 4a, second bolt through-holes 70 for inserting the three pieces of respective attachment bolts 5 are formed. In this way, the three first bolt through-holes 69 and the three second bolt through-holes 70 overlap with each other. And in the state that the first attachment flange 3d and the second attachment flange 4a are fixed to the car body side by means of the three attachment bolts 5 inserted through the three first bolt through-holes 69 and three second bolt through-holes 70 respectively, the first curved portion 3e and the taper slanting wall portion 4c are formed so that a clearance gap S between the underside 64 which is the outer peripheral surface of the taper slanting wall portion 4c and the inner peripheral curved surface 61 of the first curved portion 3e opposed to the underside 64 may be gradually enlarged toward an obliquely downward side J on a radially inward side N of the peripheral wall portion 3a.

Figure 5:
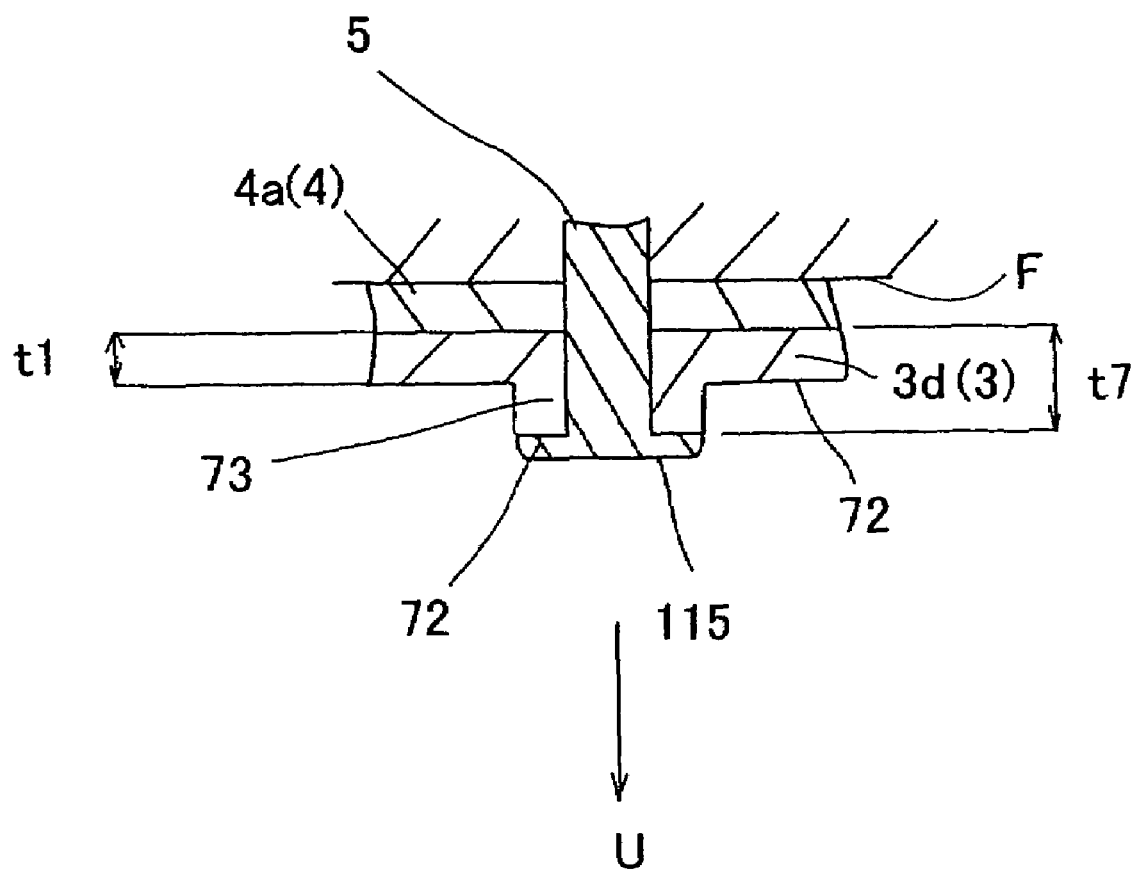
FIG. 5 is a sectional view showing a thick-walled portion of a first attachment flange and its surrounding portion.

As also illustrated in FIG. 5, an underside 72 of each flange portion around each of the first bolt through-holes 69 of the first attachment flange 3d bulges outwardly U (the downward side) of the underside 72 whereby the flange portion is configured as the thick-walled portion 73 having a uniform wall thickness. The thick-walled portion 73 is configured in a rectangular shape lengthy in the radial direction of the first attachment flange 3d when viewed from a top plane and extends from the outer peripheral edge side of the first attachment flange 3d to a side of the outer peripheral surface 50 of the peripheral wall portion 3a. More specifically, the thick-walled portion 73 is extended up to an underside 130 of the inner peripheral curved surface 61 in the radial direction of the first attachment flange 3d whereby the underside of the thick-walled portion 73 (namely the underside 72 of the flange portion) joins smoothly with the outer peripheral surface 50 of the peripheral wall portion 3a. A plate thickness t7 of the thick-walled portion 73 is set to be 5 mm.

The present embodiment has been described with the strut mount 100 for use in a front suspension of a FR type automobile, but this invention is also applicable to different strut mounts. The numerical values mentioned above are exemplary only, and another values may be adopted.

What is claimed is:

1. A strut mount comprising:
    an inner cylinder to be fixed to a piston rod of a shock absorber;
    a vibration isolating base body made of an elastomer provided on the inner cylinder; and
    a pair of an upper and a lower brackets forming a housing part, in which the vibration isolating base body is accommodated, and to be attached to a side of a car body by means of a plurality of attachment members,
    wherein the lower bracket is fabricated from aluminum alloy, and includes a peripheral wall portion forming a peripheral wall of the housing part, a bottom wall portion forming a bottom wall of the housing part, and a first attachment flange overhanging radially outwardly from an upper end of the peripheral wall portion;
    wherein the upper bracket includes a second attachment flange superposed on an upside of the first attachment flange and a lid wall portion covering the vibration isolating base body;

wherein the first attachment flange has a plurality of first through-holes for inserting the plurality of the attachment members, wherein the second attachment flange has a plurality of second through-holes for inserting the plurality of the attachment members, wherein the first attachment flange has such flange portions around the first through-holes that bulge outwardly of undersides of the flange portions to be configured each as a thick-walled portion, wherein the upper bracket is fabricated from aluminum alloy;

wherein a curved portion is interposed between the first attachment flange and the peripheral wall portion in a manner that the curved portion joins with the first attachment flange and the peripheral wall portion, the curved portion assuming an arc-like shape in axial cross-section inclusive of the axis center of the peripheral wall portion;

wherein an upwardly splaying, taper slanting wall portion is interposed between the lid wall portion and the second attachment flange in a manner that the sloping wall portion joins with the lid wall portion and the second attachment flange;

wherein the vibration isolating base body is bonded by vulcanization to the inner cylinder, wherein the attachment members are each an attachment bolt, the first through-holes are each a first bolt through-hole, and the second through-holes are each a second bolt through-hole;

wherein said curved portion and said taper slanting wall portion are configured so that a clearance gap between an underside of the taper slanting wall portion and a curved inner peripheral surface portion of the curved portion opposed to said underside is defined to become gradually larger toward a radially inward side and an obliquely downward side of the peripheral wall portion in the state that the first attachment flange and the second attachment flange are fixed to the car body side by means of the plurality of attachment bolts, and wherein said thick-walled portions extend, in a radial direction of the first attachment flange, up to a downward side of said curved inner peripheral surface portion to join at their undersides with an outer peripheral surface of the peripheral wall portion.

2. The strut mount as set forth in claim 1, wherein the taper slanting wall portion is configured in a manner such that a center of a taper angle of its upside and a center of a taper angle of its downside are located in the same position and the taper angle of the upside is set to be smaller than the taper angle of the downside, and that a thickness of the taper slanting wall portion is gradually increased from the lid wall portion toward the second attachment flange.

3. A strut mount comprising:

an inner cylinder to be fixed to a piston rod of a shock absorber;

a vibration isolating base body made of an elastomer provided on the inner cylinder; and a pair of an upper and a lower brackets forming a housing part, in which the vibration isolating base body is accommodated, and to be attached to a side of a car body by means of a plurality of attachment members, wherein the lower bracket is fabricated from aluminum alloy, and includes a peripheral wall portion forming a peripheral wall of the housing part, a bottom wall portion forming a bottom wall of the housing part, and a first attachment flange overhanging radially outwardly from an upper end of the peripheral wall portion;

wherein the upper bracket includes a second attachment flange superposed on an upside of the first attachment flange and a lid wall portion covering the vibration isolating base body;

wherein the first attachment flange has a plurality of first through-holes for inserting the plurality of the attachment members, wherein the second attachment flange has a plurality of second through-holes for inserting the plurality of the attachment members, wherein the first attachment flange has such flange portions around the first through-holes that bulge outwardly of undersides of the flange portions to be configured each as a thick-walled portion, wherein the upper bracket is fabricated from aluminum alloy;

wherein a curved portion is interposed between the first attachment flange and the peripheral wall portion in a manner that the curved portion joins with the first attachment flange and the peripheral wall portion, the curved portion assuming an arc-like shape in axial cross-section inclusive of the axis center of the peripheral wall portion;

wherein an upwardly splaying, taper slanting wall portion is interposed between the lid wall portion and the second attachment flange in a manner that the sloping wall portion joins with the lid wall portion and the second attachment flange;

wherein the vibration isolating base body is bonded by vulcanization to the inner cylinder, and wherein the taper slanting wall portion is configured in a manner such that a center of a taper angle of its upside and a center of a taper angle of its downside are located in the same position and the taper angle of the upside is set to be smaller than the taper angle of the downside, and that a thickness of the taper slanting wall portion is gradually increased from the lid wall portion toward the second attachment flange.

4. A strut mount comprising:

an inner cylinder to be fixed to a piston rod of a shock absorber;

a vibration isolating base body made of an elastomer provided on the inner cylinder; and a pair of an upper and a lower brackets forming a housing part, in which the vibration isolating base body is accommodated, and to be attached to a side of a car body by means of a plurality of attachment members, wherein the lower bracket is fabricated from aluminum alloy, and includes a peripheral wall portion forming a peripheral wall of the housing part, a bottom wall portion forming a bottom wall of the housing part, and a first attachment flange overhanging radially outwardly from an upper end of the peripheral wall portion;

wherein the upper bracket includes a second attachment flange superposed on an upside of the first attachment flange and a lid wall portion covering the vibration isolating base body;

wherein the first attachment flange has a plurality of first through-holes for inserting the plurality of the attachment members, wherein the second attachment flange has a plurality of second through-holes for inserting the plurality of the attachment members, wherein the first attachment flange has such flange portions around the first through-holes that bulge outwardly of undersides of the flange portions to be configured each as a thick-walled portion, wherein the upper bracket is fabricated from aluminum alloy;

wherein a curved portion is interposed between the first attachment flange and the peripheral wall portion in a manner that the curved portion joins with the first attachment flange and the peripheral wall portion, the curved portion assuming an arc-like shape in axial cross-section inclusive of the axis center of the peripheral wall portion;

wherein an upwardly splaying, taper slanting wall portion is interposed between the lid wall portion and the second attachment flange in a manner that the sloping wall portion joins with the lid wall portion and the second attachment flange;

wherein the vibration isolating base body is bonded by vulcanization to the inner cylinder, wherein the attachment members are each an attachment bolt, the first through-holes are each a first bolt through-hole, and the second through-holes are each a second bolt through-hole;

wherein said curved portion and said taper slanting wall portion are configured so that a clearance gap between an underside of the taper slanting wall portion and a curved inner peripheral surface portion of the curved portion opposed to said underside is defined to become gradually larger toward a radially inward side and an obliquely downward side of the peripheral wall portion in the state that the first attachment flange and the second attachment flange are fixed to the car body side by means of the plurality of attachment bolts, and wherein the taper slanting wall portion is configured in a manner such that a center of a taper angle of its upside and a center of a taper angle of its downside are located in the same position and the taper angle of the upside is set to be smaller than the taper angle of the downside, and that a thickness of the taper slanting wall portion is gradually increased from the lid wall portion toward the second attachment flange.

* * * * *